(12) United States Patent
Lee et al.

(10) Patent No.: US 10,868,314 B2
(45) Date of Patent: Dec. 15, 2020

(54) POROUS SEPARATOR INCLUDING PLURALITY OF POROUS PATTERNS, METHOD FOR PREPARING THE SAME, AND FUEL CELL USING THE SAME

(71) Applicant: LG CHEM, LTD., Seoul (KR)

(72) Inventors: Dahora Lee, Daejeon (KR); Jae Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 117 days.

(21) Appl. No.: 16/098,656

(22) PCT Filed: May 8, 2017

(86) PCT No.: PCT/KR2017/004779
§ 371 (c)(1),
(2) Date: Nov. 2, 2018

(87) PCT Pub. No.: WO2017/196050
PCT Pub. Date: Nov. 16, 2017

(65) Prior Publication Data
US 2019/0148742 A1 May 16, 2019

(30) Foreign Application Priority Data
May 9, 2016 (KR) .................. 10-2016-0056649

(51) Int. Cl.
*H01M 8/0245* (2016.01)
*H01M 8/0258* (2016.01)
(Continued)

(52) U.S. Cl.
CPC ....... *H01M 8/0245* (2013.01); *H01M 8/0232* (2013.01); *H01M 8/0234* (2013.01);
(Continued)

(58) Field of Classification Search
CPC ............ H01M 8/0245; H01M 8/0232; H01M 8/0234; H01M 8/0258
(Continued)

(56) References Cited

U.S. PATENT DOCUMENTS

2006/0024558 A1  2/2006  Friedman et al.
2011/0024295 A1  2/2011  Callahan et al.
(Continued)

FOREIGN PATENT DOCUMENTS

JP    2004-296138 A   10/2004
JP    2005-93095 A    4/2005
(Continued)

OTHER PUBLICATIONS

European Search Report for European Application 17796350.1, corresponds to PCT/KR2017/004779, dated Mar. 1, 2019.
(Continued)

*Primary Examiner* — Sean P Cullen
(74) *Attorney, Agent, or Firm* — Birch, Stewart, Kolasch & Birch LLP (57) ABSTRACT

A method of preparing a porous separator for a fuel cell, including preparing a plurality of porous pattern structures, each porous pattern structure includes a plurality of regularly repeated unit holes and a center axis passing through a center of one unit hole and through a center of another unit hole adjacent to the one unit hole, and stacking the plurality of porous pattern structures, wherein a center axis of one porous pattern structure and a center axis of another porous pattern structure adjacent to the one porous pattern structure are spaced apart from each other or intersect to form an angle of larger than 0° but lower than 90°.

18 Claims, 6 Drawing Sheets

(51) Int. Cl.
*H01M 8/0232* (2016.01)
*H01M 8/0234* (2016.01)
*H01M 8/1018* (2016.01)

(52) U.S. Cl.
CPC .. *H01M 8/0258* (2013.01); *H01M 2008/1095* (2013.01); *Y02P 70/50* (2015.11)

(58) Field of Classification Search
USPC ......................................................... 429/480
See application file for complete search history.

(56) References Cited

U.S. PATENT DOCUMENTS

2011/0310037 A1* 12/2011 Moran ..................... G06F 3/045
345/173
2014/0034511 A1 2/2014 Cordes et al.

FOREIGN PATENT DOCUMENTS

| | | | |
|---|---|---|---|
| JP | 2007-250297 A | 9/2007 | |
| JP | 2007250297 A * | 9/2007 | .......... H01M 8/0245 |
| JP | 2012-190746 A | 10/2012 | |
| JP | 2015-22802 A | 2/2015 | |
| KR | 10-0778584 B1 | 11/2007 | |
| KR | 10-2015-0134583 A | 12/2015 | |
| WO | WO-9967447 A1 * | 12/1999 | ............... C25B 9/10 |
| WO | WO 2007/105072 A2 | 9/2007 | |

OTHER PUBLICATIONS

International Search Report issued in PCT/KR2017/004779 (PCT/ISA/210), dated Aug. 11, 2017.
European Office Action for European Application No. 17796350.1, dated Jun. 17, 2020.

* cited by examiner

POROUS SEPARATOR INCLUDING PLURALITY OF POROUS PATTERNS, METHOD FOR PREPARING THE SAME, AND FUEL CELL USING THE SAME

TECHNICAL FIELD

This specification claims priority to and the benefit of Korean Patent Application No. 10-2016-0056649 filed in the Korean Intellectual Property Office on May 9, 2016, the entire contents of which are incorporated herein by reference.

The present invention relates to a method of preparing a porous separator for a fuel cell and a porous separator for a fuel cell.

BACKGROUND ART

A basic structure of a fuel cell is a structure in which a membrane-electrode assembly (MEA) in which an electrochemical reaction is generated, a gas diffusion layer (GDL) that is a porous medium which evenly disperses reaction gas to the MEA, and a separator are alternately and repeatedly stacked. A polymer electrolyte membrane fuel cell (PEMFC) among the fuel cells is an electricity generating apparatus which directly generates electricity by an electrochemical reaction of hydrogen and oxygen.

In the PEMFC, hydrogen is supplied through an anode and oxygen is supplied to a cathode. The hydrogen supplied through the anode is separated into hydrogen ions and electrons by electrode layers formed at both sides of an electrolyte. The hydrogen ions pass through an electrolyte membrane and are transmitted to the cathode, and the electrons are collected through an external conductive line through the separator to generate a current. Further, the hydrogen ions transmitted to the cathode meets oxygen in the supplied air to generate water.

The separator serves as a structure which collects and transmits the generated current, prevents a direct contact of hydrogen and oxygen to prevent a risk of explosion and combustion, transports reaction gas and a product, transmits reaction heat, and joins each electrode and a catalyst, and a gas diffusion layer.

A porous separator distributes fuel of a fuel cell and improves electrochemical performance, but the porous separator has very complex entire shape and structure, and it is difficult to form and mass-produce the separator due to the complex shape. In order to prepare a porous separator, an etching processing method or a stamping processing method is utilized, but lots of preparing cost and preparing time are consumed and it is difficult to prepare a porous separator having minute and various shapes due to a limitation in the forming.

A related art literature is Korean Patent Application Laid-Open No. 10-2015-0134583 (Patent Document 1), and the Document describes a separator for a fuel cell and a fuel cell including the same.

RELATED ART LITERATURE

Patent Document

Patent Document 1: Korean Patent Application Laid-Open No. 10-2015-0134583

DETAILED DESCRIPTION OF THE INVENTION

Technical Problem

The present invention relates to a method of preparing a porous separator for a fuel cell and a porous separator for a fuel cell.

Technical Solution

An exemplary embodiment of the present invention provides a method of preparing a porous separator for a fuel cell, the method including: preparing a plurality of porous pattern structures, each of which includes a plurality of regularly repeated unit holes and in which a center axis is set to pass through a center of one unit hole and a center of another unit hole adjacent to the one unit hole; and preparing a porous separator by stacking the plurality of porous pattern structures, in which in the preparing of the porous separator, a center axis of one porous pattern structure and a center axis of another porous pattern structure adjacent to the one porous pattern structure are spaced apart from each other or intersect to form an angle of larger than 0° but lower than 90°.

Another exemplary embodiment of the present invention provides a porous separator for a fuel cell, the porous separator including: a plurality of stacked porous pattern structures, each of which includes a plurality of regularly repeated unit holes and in which a center axis is set to pass through a center of one unit hole and a center of another unit hole adjacent to the one unit hole, in which in the plurality of porous pattern structures, center axes of adjacent porous pattern structures are spaced apart from one another or intersect to form an angle of larger than 0° but lower than 90°.

Still another exemplary embodiment of the present invention provides a fuel cell including the porous separator for the fuel cell according to another exemplary embodiment of the present invention.

Advantageous Effects

According to the exemplary embodiment of the present invention, it is possible to provide the method of preparing a porous separator for a fuel cell, which is capable of simply and easily preparing a porous separator for a fuel cell having a complex shape.

According to another exemplary embodiment of the present invention, it is possible to provide the porous separator for the fuel cell with improved fuel distributing performance and mass production availability.

BEST MODE

Throughout the specification, unless explicitly described to the contrary, the word "comprise" and variations such as "comprises" or "comprising", will be understood to imply the inclusion of stated elements but not the exclusion of any other elements. Further, in the present specification, when it is said that a specific member is positioned "on" the other member, this includes a case where another member is present between two members, as well as a case where the specific member is in contact with the other member.

Hereinafter, the present specification will be described in more detail.

An exemplary embodiment of the present invention provides a method of preparing a porous separator for a fuel cell, the method including: preparing a plurality of porous pattern structures which includes a plurality of regularly repeated unit holes, and in which a center axis is set to pass through a center of one unit hole and a center of another unit hole adjacent to the one unit hole; and preparing a porous separator by stacking the plurality of porous pattern structures, and in the preparing of the porous separator, a center axis of one porous pattern structure is spaced apart from a center axis of another porous pattern structure adjacent to the one porous pattern structure or a center axis of one porous pattern structure intersects a center axis of another porous pattern structure adjacent to the one porous pattern structure with an angle larger than 0° but lower than 90°.

According to the exemplary embodiment of the present invention, it is possible to provide a method of preparing a porous separator for a fuel cell, which is capable of simply and easily preparing a porous separator for a fuel cell having a complex shape.

According to the exemplary embodiment of the present invention, the plurality of unit holes included in the porous pattern structure may be regularly repeated, and may have the same shape. The plurality of unit holes is formed on the porous pattern structure, so that the porous pattern structure may have a porous pattern having a shape of a mesh.

According to the exemplary embodiment of the present invention, the unit hole may have a circular shape, a polygonal shape, or a shape formed of a curved line. Particularly, the unit hole may have a shape, such as an elliptical shape and a hemispherical shape, in addition to a circular shape. Further, the unit hole may also have a shape in which one or more sides of a polygon are formed with curved lines, in addition to the polygon, such as a triangle, a quadrangle, a pentagon, and a hexagon. However, the foregoing shape of the unit hole is simply an example for description, and does not limit a shape of the unit hole.

According to the exemplary embodiment of the present invention, the porous pattern structure may have a porous pattern shaped like a mesh. Particularly, according to the repetition form of the plurality of unit holes formed in the porous pattern structure, the porous pattern structure may have a porous pattern with a hole pattern, a line pattern, and a mesh pattern.

Figure 1A:
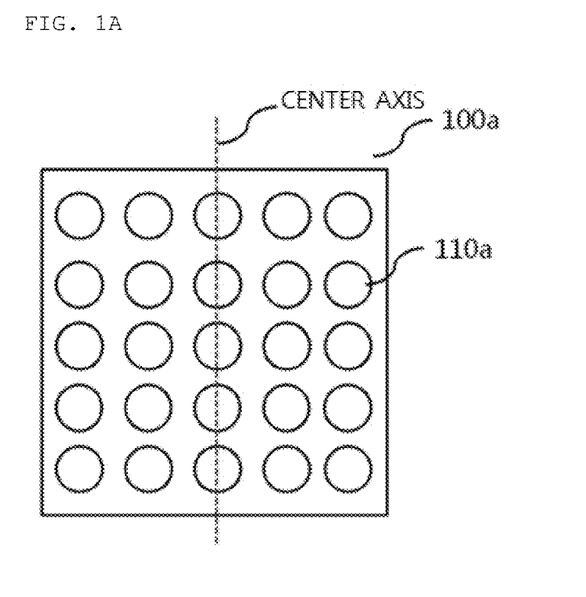
FIGS. 1A to 1C are diagrams illustrating a porous pattern structure in which a plurality of unit holes is formed according to an exemplary embodiment of the present invention.
Figure 1B:
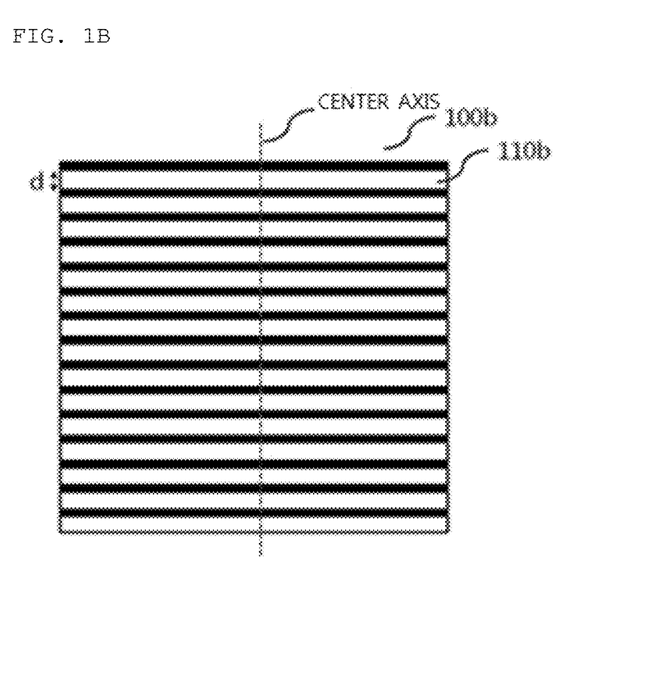
Figure 1C:
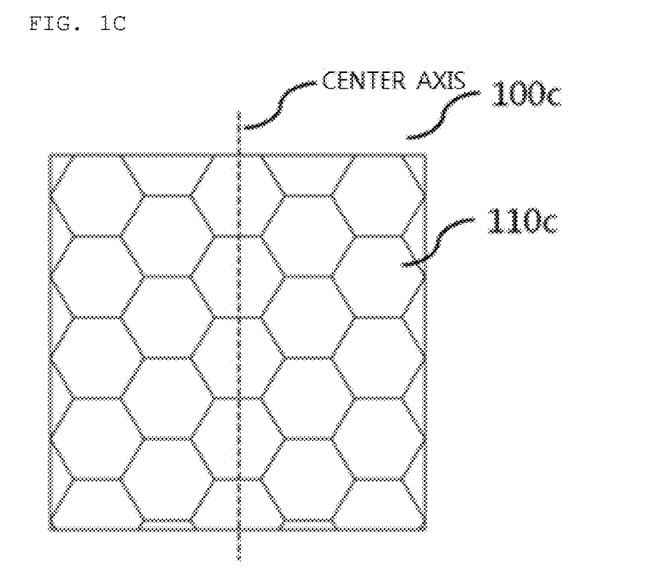

FIGS. 1A to 1C are diagrams illustrating a porous pattern structure in which a plurality of unit holes is formed according to an exemplary embodiment of the present invention. FIG. 1A is a diagram illustrating a porous pattern structure in which a porous pattern with a hole pattern is formed, FIG. 1B is a diagram illustrating a porous pattern structure in which a porous pattern with a mesh pattern is formed, and FIG. 1C is a diagram illustrating a porous pattern structure in which a porous pattern with a line pattern is formed.

Referring to FIG. 1A, the porous pattern structure 100a may have a porous pattern with a hole pattern, in which boundaries of unit holes 110a are spaced apart from one another. That is, the porous pattern structure 100a may have a porous pattern having a mesh form, in which the plurality of unit holes 110a forms a hole pattern. Further, the unit hole 110a may have a circular shape, an elliptical shape, a hemispherical shape, or a shape formed with a curved line. When the porous pattern structure 100a has the porous pattern with the hole pattern, each of the unit holes 110a may have an area of 0.5 mm$^2$ or more and 7 mm$^2$ or less, and particularly, may have an area of 2 mm$^2$ or more and 5 mm$^2$ or less. Further, one unit hole and another unit hole adjacent to the one unit hole may be formed on the porous pattern structure while being spaced apart from each other by a distance between a center of one unit hole and a center of another unit hole adjacent to the one unit hole is 5 mm or less.

Referring to FIG. 1B, the porous pattern structure 100b may have a porous pattern with a line pattern. The unit hole 110b may be elongated in a direction of one side of the porous pattern structure, and may have a shape having a predetermined width. A boundary of the unit hole 110b may have a shape of a straight line, a saw tooth pattern, a curve, or a wave pattern. Further, when the porous pattern structure 100b has the porous pattern with the line pattern, the unit hole 110b may have a width d of 2 mm or less.

Referring to FIG. 1C, the porous pattern structure 100c may have a porous pattern with a mesh pattern, in which boundaries of the plurality of unit holes 110c are in contact with one another. That is, the porous pattern structure 100c may have a porous pattern having a mesh form, in which the plurality of unit holes 110c forms a mesh pattern. The unit hole 110c may have a shape of a triangle, a quadrangle, a pentagon, a hexagon, or a polygon. Further, each of the unit holes 110c may have an area of 0.5 mm$^2$ or more and 7 mm$^2$ or less, and particularly, have an area of 2 mm$^2$ or more and 5 mm$^2$ or less.

Referring to FIGS. 1A to 1C, in the porous pattern structure, a center axis is set to pass through a center of one unit hole and a center of another unit hole adjacent to the one unit hole, and the one unit hole and another unit hole may have a structure that is symmetric based on the center axis. The center axis may be set to pass through a center of one unit hole of the porous pattern structure and a center of another unit hole that is most adjacent to the one unit hole.

According to the exemplary embodiment of the present invention, the preparing of the porous separator may stack the plurality of porous pattern structures in such a manner that the center axis of one porous pattern structure is spaced apart from the center axis of another porous pattern structure adjacent to the one porous pattern structure or the center axis of one porous pattern structure passes through the center axis of another porous pattern structure adjacent to the one porous pattern structure to form an angle of larger than 0° but lower than 90°. It is possible to prepare the porous separator having a flow path pattern with a new shape by stacking the plurality of porous pattern structures so that the center axes of the adjacent porous pattern structures are spaced apart from one another or intersect one another to form an angle of larger than 0° but lower than 90°.

According to the exemplary embodiment of the present invention, the unit holes of the plurality of porous pattern structures overlap, so that the porous separator may form a three-dimensional flow path pattern.

The porous pattern structures including the plurality of unit holes are stacked, so that it is possible to prepare the porous separator, in which the two-dimensional unit holes overlap to form the three-dimensional flow path pattern having a more complex shape.

Accordingly, according to the exemplary embodiment of the present invention, through the simple method of stacking the porous pattern structure having the unit holes having the simple shape, it is possible to easily prepare the porous separator having the three-dimensional flow path pattern having a complex shape.

Figure 2A:
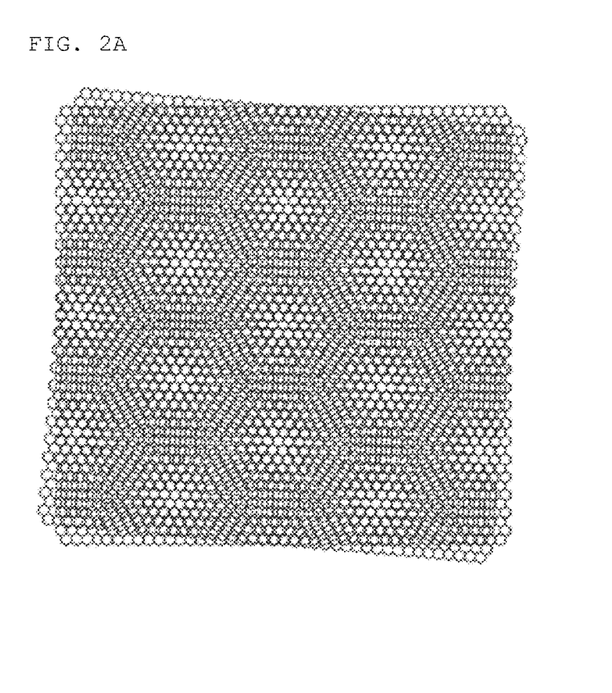
FIGS. 2A to 2C are diagrams illustrating the case where the porous pattern structures are stacked in order to prepare a porous separator for a fuel cell according to an exemplary embodiment of the present invention.
Figure 2B:
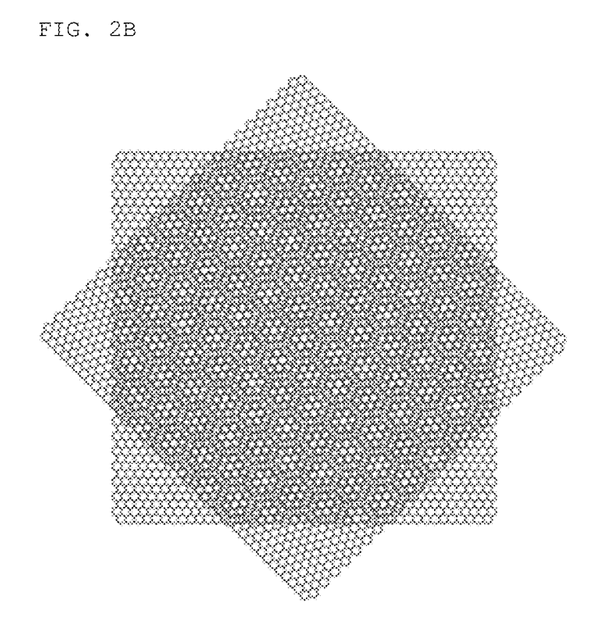
Figure 2C:
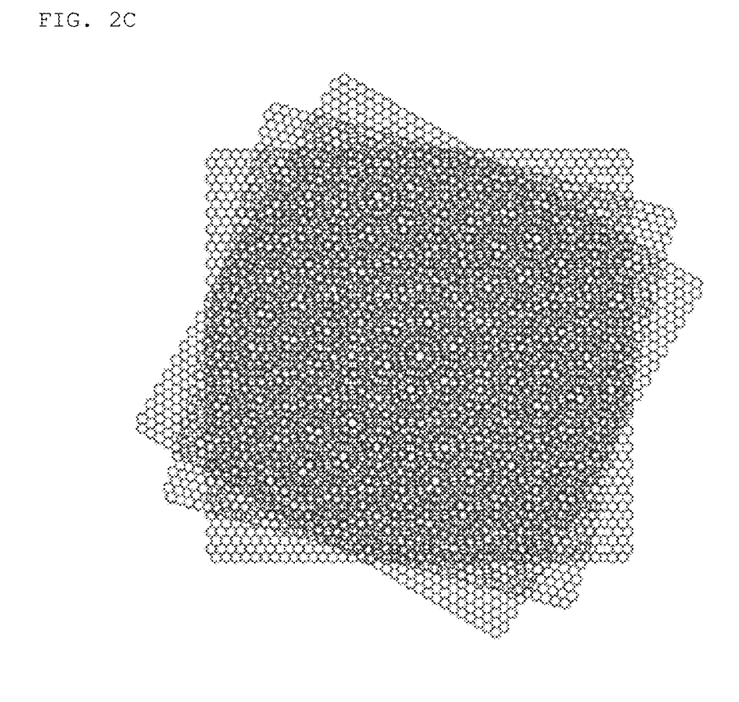

FIGS. 2A to 2C are diagrams illustrating the case where the porous pattern structures are stacked in order to prepare a porous separator for a fuel cell according to an exemplary embodiment of the present invention.

Referring to FIG. 2A, it is possible to prepare the porous separator having a flow path pattern having a new shape that is different from the shape of the unit hole of the porous pattern structure by stacking two porous pattern structures, each of which has a porous pattern with a mesh pattern formed with the plurality of hexagonal unit holes so as to have a predetermined angle between center axes of the respective porous pattern structures. When the porous separator is applied to a fuel cell, raw materials required for driving the fuel cell, an unreacted material, or a reaction product within the fuel cell may flow through the flow path pattern formed in the porous separator.

Referring to FIG. 2B, similar to FIG. 2A, two porous pattern structures having the same mesh pattern are stacked, but the two porous pattern structures may be stacked in such a manner that an angle formed by center axes of the two porous pattern structures may be different from that of FIG. 2A.

Referring to FIG. 2C, it is possible to prepare a porous separator having a flow path pattern having a new shape by stacking three porous pattern structures having a mesh pattern.

Figure 3:
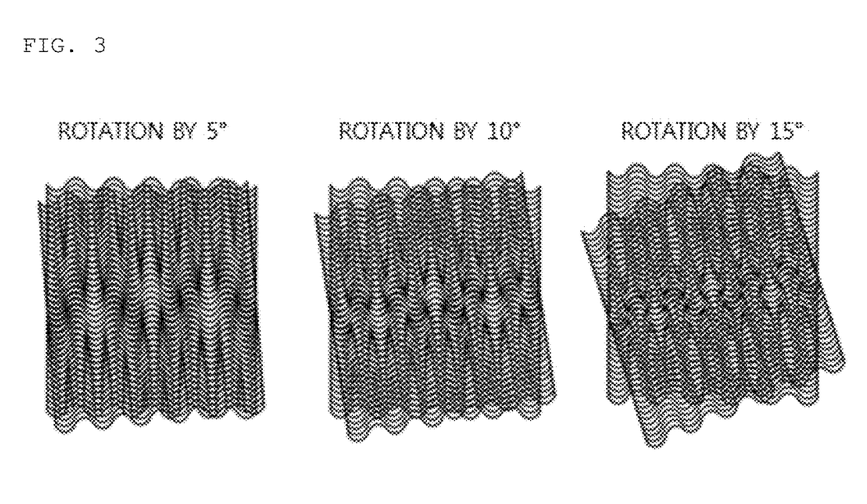
FIG. 3 is a diagram illustrating the case where a new flow path pattern is formed according to an angle formed by center axes of the adjacent porous pattern structures according to the exemplary embodiment of the present invention.

FIG. 3 is a diagram illustrating the case where a new flow path pattern is formed according to an angle formed by center axes of the adjacent porous pattern structures according to the exemplary embodiment of the present invention. FIG. 3 is a diagram illustrating the case where the porous pattern structures are stacked while varying angles formed by center axes of the porous pattern structures having porous patterns with line patterns including the plurality of unit holes which has curve-shaped boundaries.

Referring to FIG. 3, it is possible to prepare a porous separator formed with a flow path pattern having various shapes by varying the angles formed by the center axes of the stacked porous pattern structures.

According to the exemplary embodiment of the present invention, the plurality of porous pattern structures may be stacked in such a manner that the center axes of the adjacent porous pattern structures intersect to form angles larger than 0° but lower than 90°. Particularly, the plurality of porous pattern structures may be stacked in such a manner that the center axes of the adjacent porous pattern structures intersect to form angles of 10° or more and 80° or less, 20° or more and 60° or less, and 25° or more and 45° or less.

It is possible to prepare a porous separator formed with a flow path pattern having a new shape that is different from the shape of the unit hole of the porous pattern structure by stacking the plurality of porous pattern structures so that the center axes of the plurality of porous pattern structures have angles larger than 0° but lower than 90°.

Particularly, another porous pattern structure may be stacked on a porous pattern structure positioned in the lowermost layer in such a manner that a center axis of another porous pattern structure has an angle of about 5° in a clockwise direction with respect to a center axis of the porous pattern structure positioned in the lowermost layer, and still another porous pattern structure may be stacked on another foregoing porous pattern structure in such a manner that a center axis of still another porous pattern structure has an angle of about 5° in a clockwise direction with respect to the center axis of another foregoing porous pattern structure. Further, another porous pattern structure may be stacked on one porous pattern structure in such a manner that a center axis of another porous pattern structure has an angle of about 5° in a clockwise direction with respect to a center axis of the one porous pattern structure, and still another porous pattern structure may be stacked on another foregoing porous pattern structure in such a manner that a center axis of still another porous pattern structure has an angle of about 5° in a counterclockwise direction with respect to the center axis of the one porous pattern structure.

Further, each of the plurality of porous pattern structures may be stacked in such a manner that center axes of the adjacent porous pattern structures have different angles. Particularly, another porous pattern structure may be stacked on a porous pattern structure positioned in a lower layer in such a manner that a center axis of another porous pattern structure has an angle of about 5° in a clockwise direction with respect to a center axis of the porous pattern structure positioned in the lower layer, and still another porous pattern structure may be stacked on another foregoing porous pattern structure in such a manner that a center axis of still another porous pattern structure has an angle of about 7° in a clockwise direction with respect to the center axis of another foregoing porous pattern structure.

Figure 4:
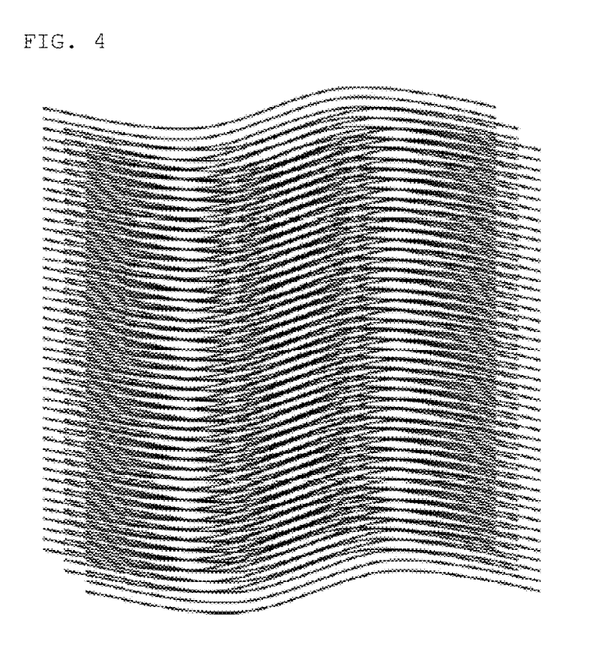
FIG. 4 is a diagram illustrating the case where the porous pattern structures are stacked in such a manner that the center axes of the porous pattern structures are spaced apart from one another in order to prepare the porous separator for the fuel cell according to the exemplary embodiment of the present invention.

FIG. 4 is a diagram illustrating the case where the porous pattern structures are stacked in such a manner that the center axes of the porous pattern structures are spaced apart from one another in order to prepare the porous separator for the fuel cell according to the exemplary embodiment of the present invention.

According to the exemplary embodiment of the present invention, it is possible to prepare a porous separator formed with a flow path pattern by stacking one porous pattern structure on another porous pattern structure adjacent to the one porous pattern structure in the state where a center axis of the one porous pattern structure is spaced apart from a center axis of another porous pattern structure. It is possible to prepare the porous separator formed with a three-dimensional flow path pattern by stacking the plurality of porous pattern structures so that boundaries of unit holes of the plurality of porous pattern structures do not completely overlap one another and the center axes of the plurality of porous pattern structures are spaced apart from one another.

Referring to FIG. 4, it is possible to easily prepare the porous separator formed with the complex-shape flow path pattern by stacking the plurality of porous pattern structures in such a manner that the center axes of the plurality of porous pattern structures are spaced apart from one another with a predetermined interval.

Particularly, in a state where an angle between a center axis of a porous pattern structure positioned in the lowermost layer and a center axis of another porous pattern structure adjacently positioned on the porous pattern structure is 0°, the two porous pattern structures may be stacked in such a manner than the center axes of the two porous pattern structures are spaced apart from each other with a predetermined interval.

According to the exemplary embodiment of the present invention, the flow path pattern may be formed with a moiré pattern on one surface of the porous separator.

The plurality of porous pattern structures including the plurality of unit holes is stacked and the plurality of unit holes overlaps, so that it is possible to form the flow path pattern on the porous separator. The flow path pattern may be represented with a moiré pattern in a plane direction of the porous separator formed with the flow path pattern. That is, when an operator and the like view the porous separator in a plane direction of the porous separator, the flow path pattern may be viewed as a moiré pattern.

According to the exemplary embodiment of the present invention, the porous separator may include two to five porous pattern structures. It is possible to prepare the porous separator formed with the flow path pattern by stacking two or more porous pattern structures. It is possible to prepare a porous separator for a fuel cell by stacking five or less porous pattern structures in order to decrease a volume of a fuel cell stack in which the porous separator is used.

However, it is possible to prepare a porous separator by stacking five or more porous pattern structures by adjusting a thickness of the porous pattern structure, and in order to form a more complex flow path pattern, it is also possible to stack five or more porous pattern structures.

According to the exemplary embodiment of the present invention, the porous pattern structure may be formed of metal material, carbon material, or carbon composite material. Particularly, stainless steel, titanium, or nickel may be used as the metal material, and a mixture of carbon fiber and resin or graphite may be used as the carbon composite material. However, the foregoing kind of material usable in the porous pattern structure is an example for description, and the kind of material is not limited.

When the porous pattern structure formed of the metal material is used, the porous pattern structure, on which a surface treatment is performed, may be used in an aspect of electrical conductivity.

According to the exemplary embodiment of the present invention, a thickness of the porous pattern structure may be 0.05 mm or more and 0.25 mm or less. The porous pattern structure having the thickness of 0.05 mm or more and 0.25 mm or less is used, thereby decreasing a volume of the porous separator formed with the flow path pattern.

According to the exemplary embodiment of the present invention, the unit holes of each of the porous pattern structures may have the same shape. Each of the porous pattern structures has the unit holes having the same shape, so that the flow path pattern may have a moiré pattern on one surface of the porous separator. Particularly, it is possible to prepare the porous separator for the fuel cell having the flow path pattern formed with a moiré pattern by stacking the porous pattern structures in which the circular unit holes are regularly repeated.

According to the exemplary embodiment of the present invention, the porous separator formed with the flow path pattern may be cut in a predetermined size. The porous separator, in which the plurality of porous pattern structures is stacked, so that the three-dimensional flow path pattern is formed, is cut in accordance with a desired size, and is usable as the porous separator for the fuel cell. Particularly, the porous separator formed with the flow path pattern is cut by using a knife or a laser in accordance with a usage area of the fuel cell and is usable as the porous separator for the fuel cell.

According to the exemplary embodiment of the present invention, it is possible to prepare the porous separator having a more complex flow path pattern by simply stacking and cutting the porous pattern structures including the plurality of unit holes having a simple shape, thereby mass producing the porous separator for the fuel cell with desired performance by a simple process.

Another exemplary embodiment of the present invention provides a porous separator for a fuel cell, in which a plurality of porous pattern structures, which includes a plurality of regularly repeated unit holes and in which a center axis is set to pass through a center of one unit hole and a center of another unit hole adjacent to the one unit hole, is stacked, and in the plurality of porous pattern structures, the center axes of the adjacent porous pattern structures are spaced apart from one another or intersect to form an angle of larger than 0° but lower than 90°.

According to another exemplary embodiment of the present invention, it is possible to provide the porous separator for the fuel cell with improved fuel distributing performance and mass production availability.

The porous pattern structure used in the porous separator for the fuel cell according to another exemplary embodiment of the present invention may be the same as the porous pattern structure used in the method of preparing the porous separator for the fuel cell according to the exemplary embodiment of the present invention.

According to another exemplary embodiment of the present invention, the unit hole may have a circular shape, a polygonal shape, or a shape formed of a curved line. Particularly, the unit hole may have a shape, such as an elliptical shape and a hemispherical shape, in addition to a circular shape. Further, the unit hole may also have a shape in which one or more sides of a polygon are formed with curved lines, in addition to the polygon, such as a triangle, a quadrangle, a pentagon, and a hexagon. However, the foregoing shape of the unit hole is simply an example for description, and does not limit a shape of the unit hole.

According to another exemplary embodiment of the present invention, the porous separator may have a three-dimensional flow path pattern which is formed according to overlapping of the unit holes of the plurality of porous pattern structures. The plurality of porous pattern structures is stacked, so that the three-dimensional flow path pattern having a complex shape different from the shape of the unit hole of the porous pattern structure may be formed in the porous separator. When the porous separator formed with the three-dimensional flow path pattern is used as the porous separator for the fuel cell, fuel may be smoothly supplied to a catalyst layer of the fuel cell through the three-dimensional flow path pattern formed in the porous separator, water occupied in most of the reaction product may be easily discharged, and a current generated in the fuel cell may be easily collected and transferred, thereby improving performance of the fuel cell.

Accordingly, according to another exemplary embodiment of the present invention, the porous separator for the fuel cell has the three-dimensional flow path pattern having the complex shape, so that fuel distribution performance and electrochemical performance of the fuel cell may be excellent.

According to another exemplary embodiment of the present invention, in the plurality of porous pattern structures included in the porous separator, the center axes of the adjacent porous pattern structures may be spaced apart from one another or may intersect to form an angle of larger than 0° but lower than 90°. The plurality of porous pattern structures may be stacked in such a manner that the center axes of the adjacent porous pattern structures intersect to form angles of 10° or more and 80° or less, 20° or more and 60° or less, and 25° or more and 45° or less.

Particularly, another porous pattern structure may be stacked on a porous pattern structure positioned in the lowermost layer in such a manner that a center axis of another porous pattern structure has an angle of about 5° in a clockwise direction with respect to a center axis of the porous pattern structure positioned in the lowermost layer, and still another porous pattern structure may be stacked on another foregoing porous pattern structure so that a center axis of still another porous pattern structure has an angle of about 5° in a clockwise direction with respect to the center axis of another foregoing porous pattern structure. Further, another porous pattern structure may be stacked on one porous pattern structure so that a center axis of another porous pattern structure has an angle of about 5° in a clockwise direction with respect to a center axis of the one porous pattern structure, and still another porous pattern structure may be stacked on another foregoing porous pattern structure so that a center axis of still another porous pattern structure has an angle of about 5° in a counterclockwise direction with respect to the center axis of the one porous pattern structure.

Further, each of the plurality of porous pattern structures may be stacked in such a manner that center axes of the adjacent porous pattern structures have different angles. Particularly, another porous pattern structure may be stacked on a porous pattern structure positioned in a lower layer in such a manner that a center axis of another porous pattern structure has an angle of about 5° in a clockwise direction with respect to a center axis of the porous pattern structure positioned in the lower layer, and still another porous pattern structure may be stacked on another foregoing porous pattern structure in such a manner that a center axis of still another porous pattern structure has an angle of about 7° in a clockwise direction with respect to the center axis of another foregoing porous pattern structure.

According to another exemplary embodiment of the present invention, one porous pattern structure may be stacked on another porous pattern structure adjacent to the one porous pattern structure in a state where a center axis of the one porous pattern structure is spaced apart from a center axis of another porous pattern structure.

The porous separator may have the three-dimensional flow path pattern by stacking the plurality of porous pattern structures so that boundaries of unit holes of the plurality of porous pattern structures do not completely overlap one another and the center axes of the plurality of porous pattern structures are spaced apart from one another.

Particularly, in a state where an angle between a center axis of a porous pattern structure positioned in the lowermost layer and a center axis of another porous pattern structure adjacently positioned on the porous pattern structure is 0°, the two porous pattern structures may be stacked in such a manner than the center axes of the two porous pattern structures are spaced apart from each other with a predetermined interval.

According to another exemplary embodiment of the present invention, the flow path pattern may be formed with a moiré pattern on one surface of the porous separator. The flow path pattern may be represented with a moiré pattern in a plane direction of the porous separator formed with the flow path pattern. That is, when an operator and the like view the porous separator in a plane direction of the porous separator, the flow path pattern may be viewed as a moiré pattern.

According to another exemplary embodiment of the present invention, the unit holes of each of the porous pattern structures may have the same shape. Each of the porous pattern structures has the unit holes having the same shape, so that the flow path pattern may have a moiré pattern on one surface of the porous separator.

Still another exemplary embodiment of the present invention provides a fuel cell including the porous separator for a fuel cell according to another exemplary embodiment of the present invention.

According to still another exemplary embodiment of the present invention, the fuel cell may have the same configuration as that of the fuel cell typically used in the art. Particularly, the fuel cell may include a membrane electrode assembly (MEA) provided with an electrolyte layer between an anode and a cathode, a separator, and a gas diffusion layer, and the porous separator for the fuel cell according to another exemplary embodiment of the present invention may be used as the separator.

Accordingly, according to still another exemplary embodiment of the present invention, the fuel cell includes the porous separator for the fuel cell according to another exemplary embodiment of the present invention, thereby having excellent fuel distribution performance and electrochemical performance.

Hereinafter, the present invention will be described in more detail with reference to the Examples. These Examples are only illustrative and are not intended to limit the technical scope of the present invention.

Example 1

Figure 5:
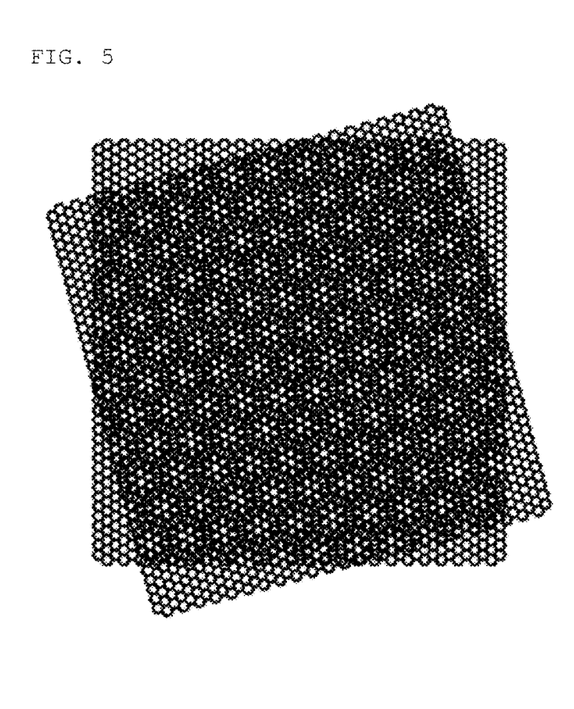
FIG. 5 is a diagram illustrating the case where porous pattern structures are stacked in order to prepare a porous separator for a fuel cell according to Example 1 of the present invention.

FIG. 5 is a diagram illustrating the case where porous pattern structures are stacked in order to prepare a porous separator for a fuel cell according to Example 1 of the present invention.

Referring to FIG. 5, two porous pattern structures, each of which had a porous pattern with a mesh pattern including repeated hexagonal unit holes having an area of 0.8 $mm^2$, had a thickness of 0.2 mm, and was made of stainless steel, were prepared. Carbon coating was performed on the two porous pattern structures before stacking, so that a surface of the porous pattern structure was conducting processed. One porous pattern structure between the two porous pattern structures was positioned, and the other porous pattern structure was stacked so as to have 15° in a counterclockwise direction with respect to a center axis of the one porous pattern structure. A porous separator formed with a three-dimensional flow path pattern was prepared by stacking two porous pattern structures having the porous pattern with the mesh pattern. As illustrated in FIG. 5, it can be seen that the flow path pattern is represented as a moiré pattern in a plane direction of the porous separator. The porous separator for the fuel cell was prepared by cutting the porous separator having the flow path pattern in 50 mm in width and 50 mm in length.

Example 2

Figure 6:
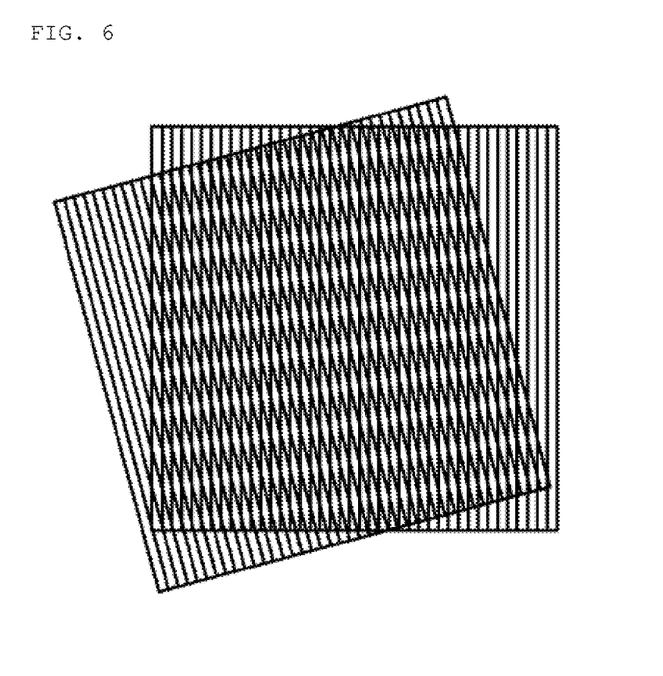
FIG. 6 is a diagram illustrating the case where porous pattern structures are stacked in order to prepare a porous separator for a fuel cell according to Example 2 of the present invention.

FIG. 6 is a diagram illustrating the case where porous pattern structures are stacked in order to prepare a porous separator for a fuel cell according to Example 2 of the present invention.

Referring to FIG. 6, two porous pattern structures, each of which had a porous pattern with a line pattern which has a width of 0.1 mm and in which boundary surfaces of unit holes are spaced apart from one another by 0.1 mm, had a thickness of 0.1 mm, and was made of stainless steel, were prepared. Except for the preparation of the two porous pattern structures, a porous separator for a fuel cell was prepared as illustrated in FIG. 6 by the same method as that of Example 1.

Comparative Example 1

A flow separator (LG CHEM Company), which had a thickness of 0.2 mm and included a plurality of circular holes having a diameter of 1 mm, was prepared.

Test of Fuel Cell Performance

Fuel cell 1 including the porous separator for the fuel cell according to Example 1, a cathode (LG CHEM Company), an anode (LG CHEM Company), a hydrocarbon-based MEA (LG CHEM Company), a gas diffusion layer (JNT30, JNTG Company) was prepared. Further, except that the porous separator for the fuel cell according to Comparative Example 1 was included, fuel cell 2 having the same configuration as that of fuel cell 1 was prepared.

Under a temperature condition of 70° C., a pressure condition of 1 bar, and a humidity condition of RH 50%, hydrogen was supplied to an anode of each of fuel cell 1 and fuel cell 2 and oxygen was supplied to a cathode of each of fuel cell 1 and fuel cell 2 by adjusting a flow rate of hydrogen to be 1.5 and a flow rate of air to be 2.0 based on a stoichiometric ratio.

Figure 7:
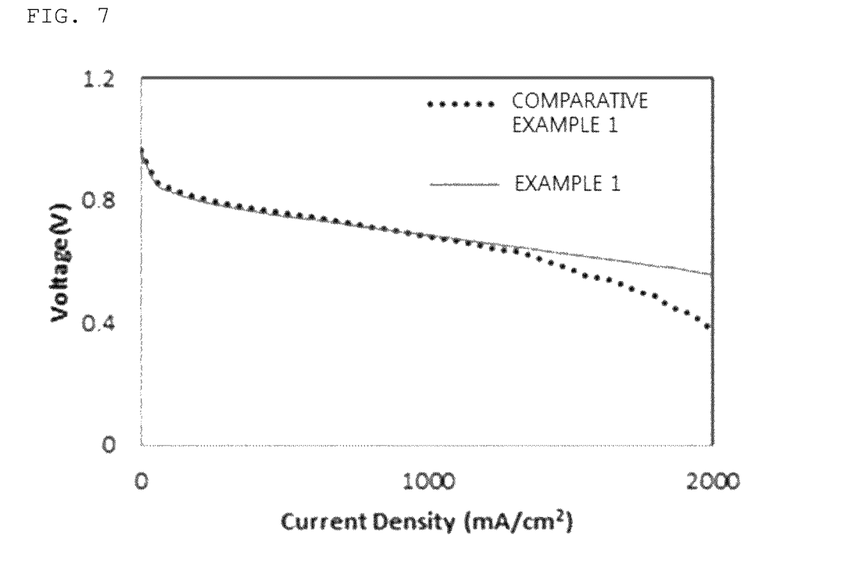
FIG. 7 is a graph representing I-V curves of a fuel cell including the porous separator for the fuel cell according to Example 1 of the present invention and a fuel cell including a separator according to Comparative Example 1.

FIG. 7 is a graph representing I-V curves of a fuel cell including the porous separator for the fuel cell according to Example 1 of the present invention and a fuel cell including a separator according to Comparative Example 1. FIG. 7 represents I-V curves of fuel cell 1 and fuel cell 2, and a voltage corresponding to each current density was measured with a gap of 50 mA/cm$^2$ in a current density range of 0 or more and 2,000 or less mA/cm$^2$.

Referring to FIG. 7, it can be seen that a voltage of the fuel cell 1 including the porous separator for the fuel cell according to Example 1 of the present invention is higher than a voltage of fuel cell 2 including the porous separator for the fuel cell according to Comparative Example 1. Accordingly, it can be seen that performance of fuel cell 1 including the porous separator for the fuel cell according to Example 1 of the present invention is more excellent than that of fuel cell 2 including the porous separator for the fuel cell according to Comparative Example 1.

The above description of the present invention is illustrative, and those skilled in the art to which the present invention pertains may understand that modifications to other particular forms may be easily made without changing the technical spirit or the essential feature of the present invention. Thus, it is to be appreciated that the embodiments described above are intended to be illustrative in every sense, and not restrictive. For example, each constituent element described in a singular form may be distributed and carried out, and similarly, constituent elements described in a distributed form may be carried out in a combination form.

The scope of the present invention is represented by the claims to be described below rather than the detailed description, and it is to be interpreted that the meaning and scope of the claims and all the changes or modified forms derived from the equivalents thereof come within the scope of the present invention.

EXPLANATION OF REFERENCE NUMERALS AND SYMBOLS 100a, 100b, 100c: Porous pattern structure
110a, 110b, 110c: Unit hole

The invention claimed is:

1. A method of preparing a porous separator for a fuel cell, the method comprising:
preparing a plurality of porous pattern structures, wherein each porous pattern structure includes a plurality of regularly repeated unit holes and a center axis passing through a center of one unit hole of the unit holes and a center of another unit hole of the unit holes adjacent to the one unit hole in a first direction, each unit hole having an area of 0.5 to 7 square millimeters;
rotating a second porous pattern structure relative to a first porous pattern structure by up to 15 degrees; and
stacking the plurality of porous pattern structures in a second direction,
wherein the center axis of the first porous pattern structure and the center axis of the second porous pattern structure adjacent to the first porous pattern structure are spaced apart from each other in the second direction and intersect to form an angle of larger than 0° but lower than 90°.

2. The method of claim 1, wherein the unit holes of each of the porous pattern structure have the same shape.

3. The method of claim 1, wherein each unit hole has a circular shape, a polygonal shape, or a shape formed with a curve.

4. The method of claim 1, wherein the respective unit holes of the plurality of porous pattern structures overlap, and the porous separator is formed with a three-dimensional flow path pattern.

5. The method of claim 1, wherein the plurality of porous pattern structures includes two to five porous pattern structures.

6. The method of claim 1, wherein each porous pattern structure is formed of metal material, carbon material, or carbon composite material.

7. The method of claim 1, wherein a thickness of each porous pattern structure is 0.05 mm or more and 0.25 mm or less.

8. The method of claim 1, further comprising forming circular apertures in a sheet of material to form each of the plurality of porous pattern structures.

9. The method of claim 1, wherein the first porous pattern structure is identical to the second porous pattern structure.

10. The method of claim 9, wherein each unit hole has a circular shape.

11. A porous separator for a fuel cell, the porous separator comprising:
a plurality of stacked porous pattern structures, wherein each porous pattern structure includes a plurality of regularly repeated unit holes and a center axis passing through a center of one unit hole of the unit holes and passing through a center of another unit hole of the unit holes adjacent to the one unit hole in a first direction, each unit hole having an area of 0.5 to 7 square millimeters, wherein the center axis of a first porous pattern structure and the center axis of a second porous pattern structure adjacent to the first porous pattern structure are spaced apart from one another in a second direction and intersect to form an angle of larger than 0° but lower than 90°, and wherein the second porous pattern structure is rotated relative to the first porous pattern structure by up to 15 degrees so that an upper edge of the second porous pattern structure is offset from an upper edge of the first porous pattern structure by up to 15 degrees.

12. The porous separator of claim 11, wherein the unit holes of each of the porous pattern structures have the same shape.

13. The porous separator of claim 11, wherein each unit hole has a circular shape, a polygonal shape, or a shape formed with a curve.

14. The porous separator of claim 11, wherein the porous separator has a three-dimensional flow path pattern formed by overlapping of the respective unit holes of the plurality of porous pattern structures.

15. The porous separator of claim 11, wherein each of the plurality of porous pattern structures is a sheet having circular apertures.

16. The porous separator of claim 11, wherein the first porous pattern structure is identical to the second porous pattern structure.

17. The porous separator of claim 16, wherein each unit hole has a circular shape.

18. A fuel cell comprising the porous separator of claim 11.

* * * * *